United States Patent [19]

Peiffer et al.

[11] Patent Number: 5,885,704
[45] Date of Patent: *Mar. 23, 1999

[54] ORIENTED POLYOLEFIN FILM WITH AMORPHOUS POLYMER, A PROCESS FOR ITS PRODUCTION AND ITS USE

[75] Inventors: Herbert Peiffer, Mainz; Ursula Murschall, Nierstein; Gunter Schloegl; Frank Osan, both of Kelkheim; Thomas Dries, Schwabenheim, all of Germany

[73] Assignee: Ticona GmbH, Frankfurt, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 693,845

[22] Filed: Aug. 2, 1996

Related U.S. Application Data

[63] Continuation of Ser. No. 409,164, Mar. 23, 1995, Pat. No. 5,573,717.

[30] Foreign Application Priority Data

Mar. 26, 1994 [DE] Germany .......................... 44 10 559.2

[51] Int. Cl.$^6$ ..................................... B32B 3/26
[52] U.S. Cl. .................... 428/315.9; 428/314.4; 428/315.5; 428/319.3; 428/319.7
[58] Field of Search ............................. 428/314.4, 315.5, 428/315.9, 319.7

[56] References Cited

U.S. PATENT DOCUMENTS

| Re. 34,742 | 9/1994 | Maier et al. .......................... 428/315.5 |
|---|---|---|
| 4,303,708 | 12/1981 | Gebhardt et al. .......................... 428/35 |
| 4,375,989 | 3/1983 | Mäkinen ................................. 106/300 |
| 4,377,616 | 3/1983 | Ashcraft et al. ..................... 428/315.9 |
| 4,447,271 | 5/1984 | Howard et al. .......................... 106/300 |
| 4,622,237 | 11/1986 | Lori ........................................... 427/40 |
| 4,698,261 | 10/1987 | Bothe et al. .............................. 428/516 |
| 4,758,462 | 7/1988 | Park et al. ........................... 428/315.5 |
| 4,842,187 | 6/1989 | Janocha et al. ......................... 428/516 |
| 4,944,990 | 7/1990 | Liu et al. .............................. 428/304.4 |
| 4,994,312 | 2/1991 | Maier et al. .......................... 428/315.5 |
| 5,134,173 | 7/1992 | Joesten et al. .......................... 264/45.5 |
| 5,178,942 | 1/1993 | Frognet et al. ....................... 428/315.5 |
| 5,246,769 | 9/1993 | Murschall et al. ...................... 428/910 |
| 5,324,801 | 6/1994 | Brekner et al. .......................... 526/160 |
| 5,371,158 | 12/1994 | Brekner et al. .......................... 526/127 |

FOREIGN PATENT DOCUMENTS

| 2115196 | 8/1994 | Canada . |
|---|---|---|
| 0 004 633 | 10/1979 | European Pat. Off. . |
| 0 044 515 | 1/1982 | European Pat. Off. . |
| 0 078 633 | 5/1983 | European Pat. Off. . |
| 0 083 495 | 7/1983 | European Pat. Off. . |
| 0 180 087 | 5/1986 | European Pat. Off. . |
| 0 236 945 | 9/1987 | European Pat. Off. . |
| 0 244 614 | 11/1987 | European Pat. Off. . |
| 0 351 463 | 1/1990 | European Pat. Off. . |
| 0 386 896 | 9/1990 | European Pat. Off. . |
| 0 436 178 | 7/1991 | European Pat. Off. . |
| 0 485 893 | 5/1992 | European Pat. Off. . |
| 0 503 422 | 9/1992 | European Pat. Off. . |
| 0 610 814 | 8/1994 | European Pat. Off. . |
| 214 623 | 10/1984 | Germany . |
| 38 01 535 | 7/1988 | Germany . |
| 41 28 820 | 3/1993 | Germany . |
| 2 201 407 | 9/1988 | United Kingdom . |

OTHER PUBLICATIONS

Ullmanns Encyklopädie der Techn. Chemie, 4 Aufl., Bd. 12, pp. 525–555.

Hansl Loos, "Farbmessung", 1989, pp. 5, 172–177.

Database WPI, Derwent Publications Ltd., London, GB; AN 73–64662u, JP 48051976.

*Primary Examiner*—Tae Yoon

[57] ABSTRACT

The disclosed oriented polyolefin film contains at least one voided layer. The voided layer contains an amorphous void-initiating polymer which, after orienting, is present as a separate particle inside the void. In the process for producing the polyolefin film, a molten blend comprising an olefin polymer and the amorphous polymer is extruded through a die at an extrusion temperature above the glass temperature or Vicat softening point of the amorphous polymer, the resulting film is drawn off on one or more rollers, and is then subjected to stretch orientation, followed optionally by thermofixing and a surface treatment.

18 Claims, No Drawings

ORIENTED POLYOLEFIN FILM WITH AMORPHOUS POLYMER, A PROCESS FOR ITS PRODUCTION AND ITS USE

CROSS REFERENCE TO RELATED APPLICATION

This application is a continuation of our application Ser. No. 08/409,164, filed Mar. 23, 1995 now U.S. Pat. No. 5,573,917.

FIELD OF THE INVENTION

The present invention relates to an oriented polyolefin film with at least one voided layer. The invention also relates to a process for producing the polyolefin film and to its use. Another aspect of this invention relates to a method for introducing voids into a voided layer and a masterbatch material formulated for that purpose.

DESCRIPTION OF THE PRIOR ART

Olefin polymer films are used for many diverse applications and can, in a rough view, be divided into two groups, namely the transparent and non-transparent types of films. Transparent films show of course the lowest possible opacity, while the non-transparent types show such a high opacity that a meaningful measurement of this parameter is not possible. In the case of non-transparent films, it is therefore their light transmission which is determined. Depending on the degree of light transmission, a distinction is made between translucent and opaque or white films.

Non-transparent films contain, in at least one layer, pigments or void-initiating particles or a combination thereof, so that the films show a reduced light transmission as compared with transparent films.

Pigments are particles which essentially do not lead to the formation of voids during the stretching of the film. The coloring action of the pigments is caused by the particles themselves. The term "pigment" is in general tied to a particle size of from 0.01 to at most 1 μm and comprises both so-called "white pigments", which confer a white color upon the films, and "color pigments" which confer a coloration or a black color upon the film.

Opaque films contain vacuole-initiating particles which are incompatible with the polymer matrix and, on stretching of the films, cause the formation of vacuole-like cavities, the size, nature and number of the vacuoles depending on the material and on the size of the solid particles and on the stretching conditions such as stretching ratio and stretching temperature. Throughout the specification and the claims such vacuole-like cavities are called "voids" and a layer comprising such vacule-like cavities is called "voided layer". The voids reduce the density and provide the films with a characteristic mother of pearl-like opaque appearance which results from scattering of light at the void/polymer matrix interfaces. In general, the mean particle diameter of the void-initiating particles is 1 to 10 μm.

Conventional void-initiating particles are inorganic and/or organic materials incompatible with polypropylene, such as oxides, sulfates, carbonates or silicates, and incompatible polymers such as polyesters or polyamides. The term "incompatible materials" or "incompatible polymers" means that the material or the polymer is present as a separate particle or as a separate phase in the film.

The density of the non-transparent films can vary within wide limits and depends on the nature and the quantity of the fillers. The density is in general within the range from 0.4 to 1.1 g/cm$^3$.

Such non-transparent films are described in detail in the following publications:

EP-A-0,004,633 describes a heat-sealable, opaque, biaxially oriented plastic film which contains finely disperse solid, in particular inorganic, particles of a size from 0.2 to 20 μm and possesses at least one heat-sealing layer composed of a propylene/ethylene copolymer. In addition to the inorganic particles, opaque organic particles, for example those composed of crosslinked plastic, are also suitable for providing opacity, the melting point of the plastic particles being above the temperatures which arise during the manufacture of the film. The sealability, the gloss and the imprintability of the film are said to be improved as compared with the state of the art. The film described has the disadvantage that its opacity and its density are susceptible to fluctuations caused by the raw material and the process, and these can be compensated mainly by altering the particle concentration. Depending on the particle concentration and the particle size distribution, however, agglomerations of the particles can occur, whereby the optical character of the film becomes non-uniform and is impaired. In principal, the opacity of these opaque films depends, at constant particle concentration, on the film thickness. In addition, the mechanical properties of the film still require improvement. If inorganic particles are used, the film shows undesired chalking during fabrication and further processing.

EP-A-0,083,495 describes a non-transparent, biaxially oriented film having a glazed appearance and a surface gloss of more than 100% and containing at least one spherical solid particle per void. Furthermore, the film contains, on both surfaces of the core layer, a pore-free, transparent, thermoplastic outer layer having a thickness which determines the optical character of the film. Nylon is indicated, for example, as a material for the solids particle. As a rule, the particles have a diameter which is greater than 1 μm. In the case of this film again, the opacity is determined mainly by the quantity of the solids particles and by the process parameters during the biaxial orienting, and the previously described disadvantages with respect to fluctuations in opacity occur.

Accordingly, there is still a need for a non-chalking, non-transparent polyolefin film with good mechanical and homogeneous optical properties in which the translucence or the opacity can be set by simple measures and can be varied within wide limits. A film of this type with high stiffness and a high gloss would be particularly desirable. The preparation of such a film is an objective of this invention.

SUMMARY OF THE INVENTION

A polyolefin film of this invention (which can be a single-layer film or can have a plurality of layers) can satisfy this objective by being comprised of a voided layer which comprises an amorphous, void-initiating polymer which, after orienting, is present as a separate particle within the void. The result is a layer comprising an olefin polymer matrix with essentially uniformly distributed particle-containing voids.

The amount of amorphous void-initiating polymer, based on the weight of the voided layer (if the film is a single-layer structure, the "voided layer" is the same as the film as a whole), is generally 1 to 40% by weight.

Although this invention is not bound by any theory, it is presently believed that the amorphous, void-initiating polymer is initially blended essentially homogeneously with the olefin polymer under polymer-liquefying conditions, just as any two different powdered or granulated polymers might be blended together in a more or less uniform way under such conditions. But, during extrusion of the resulting substantially uniform polymer mixture, the amorphous polymer surprisingly forms particulate grains in situ. The size of the grains thus formed presently appears to be related to the viscosity of the olefin polymer of the voided layer and the viscosity of the amorphous polymer, at the selected extrusion temperature. These in situ formed grains of amorphous polymer do not appear to agglomerate, and they act, during the orienting of the film, in a manner somewhat similar to known particulate void-initiating fillers.

This theory explains why the present invention is able to achieve void formation wherein the voids, after orientation of the film, contain the void-initiating amorphous polymer as a separate particle within the void; the theory also explains why this invention is able to achieve essentially uniformly distributed void-initiating particles and controllable variations in opacity and gloss through control over the conditions under which the blend of olefin polymer and amorphous polymer are extruded (i.e. without necessarily varying the raw materials used or the stretching ratios or the like). Thus, the instant invention is believed to have opened up entirely new approaches for adjusting the characteristics of a translucent or opaque film.

A key parameter in the void-forming aspect of this invention thus appears to be the extrusion temperature, which is above the glass transistion temperature, $T_G$ of the amorphous polymer (this $T_G$ is preferably in the range from 70° to 300° C., most preferably 80° to 250° C., in particular 100° to 200° C.) and/or above the Vicat softening point, $T_V$ (VST/B/120) of the amorphous polymer. This $T_V$ value is preferably between 70° and 200° C.

In other respects, the extrusion step of the process of this invention is similar to conventional extrusions. The polymers or polymer blend are compressed in an extruder and heated, and the resulting melt is extruded (or co-extruded in the case of a film having a plurality of layers) through a suitable die such as a sheet die. The film thus obtained is drawn off for solidification on one or more rollers and is then subjected to biaxial stretch orientation. The stretching is preferably 4:1 to 7:1 in the longitudinal direction and preferably 6:1 to 11:1 in the transverse direction. The biaxially-oriented film can be thermofixed and is optionally corona-treated or flame-treated on at least one surface.

The amorphous polymer component is incorporated into the film or film layer as pure granules or as a granulated concentrate (masterbatch), by premixing the olefin polymer granules or powder with the amorphous polymer or masterbatch and then feeding the mixture to the extruder. The masterbatch typically comprises more than 40% by weight of the amorphous, void-initiating polymer, e.g. 45 to 98% by weight, preferably 50 to 90% by weight of this polymer, essentially the balance of the masterbatch comprising an olefin polymer of the type described herein with respect to the voided layer.

DETAILED DESCRIPTION

As indicated above, a film of this invention is a single-layer film or a multilayer film. Single-layer embodiments have a structure like that of the voided layer, described below, of the multilayer film. Multilayered embodiments comprise at least two layers and always comprise the voided layer and at least one further layer, it being possible for the voided layer to form the base layer (which is typically the innermost layer), the interlayer or the top (outermost) layer of the multilayer film. In a preferred embodiment, the voided layer forms the base layer of the film with at least one top or outermost layer and preferably outermost layers on both sides, it being possible, if desired, for a non-voided or voided interlayer or interlayers to be present on one or both sides between the voided base layer and the top or outermost layer(s). In a further preferred embodiment, the voided layer forms an interlayer of the multilayer film, which interlayer is located between the non-voided base layer and the top or outermost layer. Further embodiments with a voided interlayer are of five-layered structure and have voided interlayers on both sides. In a further embodiment, the voided layer can form a top layer on the voided or non-voided base layer or interlayer. Within the scope of the present invention, the base layer is that layer which makes up more than 50% of the total film thickness. The "top" layer, as indicated above, is the layer which forms the outermost layer of the film.

Depending on its intended use, the particular embodiment of the non-transparent film can be translucent, opaque or white-opaque. Within the scope of the present invention, non-transparent films are to be understood as those films whose light transmission according to ASTM-D 1003-77 is less than 95%. A distinction is made between translucent, opaque and/or white-opaque types in accordance with their light transmission. Translucent films have a light transmission of 95 to 70%, and opaque or white-opaque types have a light transmission of 69 to 0%, each measured according to ASTM-D 1003-77.

The voided layer of the film according to the invention contains an olefin polymer, preferably a propylene polymer, and an amorphous, void-initiating polymer and, if appropriate, further added additives, each in effective quantities. In general, the voided layer contains at least 50% by weight, preferably 70 to 99% by weight, in particular 80 to 98% by weight, of the propylene polymer, relative to the weight of the voided layer.

The propylene polymer contains in general 90 to 100% by weight, preferably 95 to 100% by weight, in particular 98 to 100% by weight, of propylene and has in general a melting point of 120° C. or higher, preferably 150° to 170° C. and in general a melt index of 0.5 g/10 minutes to 8 g/10 minutes, preferably 2 g/10 minutes to 5 g/10 minutes, at 230° C. and a force of 21.6N (DIN 53 735). Isotactic propylene homopolymer having an atactic content of 15% by weight and less, copolymers of ethylene and propylene with an ethylene content of 10% by weight or less, copolymers of propylene with $C_4$-$C_8$-α-olefins with an α-olefin content of 10% by weight or less, terpolymers of propylene, ethylene and butylene with an ethylene content of 10% by weight or less and with a butylene content of 15% by weight or less represent preferred propylene polymers for the voided layer, isotactic propylene homopolymer being particularly preferred. The weight percentages indicated relate to the particular polymer.

Furthermore, a blend of the said propylene homopolymers and/or copolymers and/or terpolymers and other polyolefins, in particular monomers having 2 to 6 carbon atoms, is suitable, the blend containing at least 50% by weight, in particular at least 75% by weight, of propylene polymer. Suitable other polyolefins in the polymer blend are polyethylenes, in particular HDPE, LDPE and LLDPE, the content of these polyolefins in each case not exceeding 15% by weight, relative to the polymer blend.

According to the invention, the voided layer or, in the case of single-layer embodiments, the film comprises an amorphous, void-initiating polymer in general in a quantity of at most 40% by weight, preferably 1 to 30% by weight, in particular 2 to 20% by weight, relative to the weight of the voided layer or of the film. It has been found that the amorphous polymer, which per se is a polymeric solid and as a raw material does not have the character of particles, surprisingly nevertheless acts as a void-initiating filler, apparently due to the formation of particles in situ.

Although this invention is not bound by any theory, there is evidence that, during the stretch-orienting of the film, microcracks and microcavities, so-called vacuoles or voids, in the region of which the visible light is refracted, form between the polymer matrix of the layer and the amorphous polymer, despite the fact that the amorphous polymer and the olefin polymer are blended under polymer-liquefying conditions, so that initially no particulate amorphous phase is discernible. Void formation provides the film with a translucent or opaque appearance and with a reduced density (compared to the calculated density of the ingredients), which make it particularly suitable for certain packaging purposes, in particular in the foodstuffs sector. As explained above, grains of amorphous polymer are believed to appear for the first time during extrusion. This amorphous polymer grain-formation appears to determine important, later-introduced characteristics of the ultimately obtained voided layer, which characteristics (resulting from void formation) are actually introduced during the stretch orientation steps of the process of preparing the film.

Within the scope of the present invention, "amorphous polymers" are to be understood as those polymers which are solids at room temperature in spite of an irregular arrangement of the molecule chains. They are essentially non-crystalline, and their degree of crystallinity is in general below 5%, preferably below 2%, or is 0%. Those amorphous polymers are particularly suitable whose glass transition temperature $T_G$ is in the range from 70° to 300° C., preferably 80° to 250° C., in particular 100° to 200° C., or whose Vicat softening point $T_V$ (VST/B/120) is between 70° and 200° C., preferably between 80° and 180° C. In general, the amorphous polymer has a mean molecular weight $M_W$ in the range from 500 to 500,000, preferably 1,000 to 250,000, in particular 3,000 to 200,000.

The refractive index of the amorphous polymer is in general in the range from 1.3 to 1.7, preferably 1.4 to 1.6. In this case, it is particularly advantageous for the refractive index of the amorphous polymer, if it has a defined relationship to the refractive index of the polyolefin of the voided layer. In general, the refractive indices of amorphous polymer and polypropylene do not differ by more than 0.1 units, preferably by at most 0.05 units.

In the oriented film, the amorphous polymer is surprisingly present in the form of separate particles, which are clearly visible in scanning electron micrographs, particularly when the particles are at least partially torn off by the orientation, i.e. if an at least incipient void-like cavity has formed around the particle of amorphous polymer. The particle size of the particles present in the oriented film is in the range from 0.2 to 10 μm, preferably 0.5 to 7 μm, in particular 1 to 5 μm. Surprisingly, voids form around the particles of amorphous polymer even in the case of very small particle sizes of $\leq 1$ μm.

The amorphous polymer having the property pattern described above can be one of a large number of as a rule transparent polymers. Examples thereof are atactic polystyrene ($T_G$=95° to 105° C., preferably 100° C.), poly-α-methylstyrene ($T_G$=170° to 180°, preferably 175° C.), polycarbonate ($T_V$=120° to 160° C., preferably 140° C.), aromatic polycarbonates having reduced heat distortion ($T_V$=160° to 190° C., preferably 172° C.), polyacrylates, in particular polymethyl methacrylate ($T_G$=115° to 130°, preferably 122° C.), amorphous homo- and copolymers of polycyclic olefins ($T_G$=70° to 300° C. depending on the composition and the molecular weight), polyvinylcarbazole ($T_G$=180° to 220° C., preferably 200° C.), atactic polyvinylcyclohexane ($T_G$=130° to 150° C., preferably 140° C.), polyvinyl chloride ($T_G$=65° to 90° C., preferably 80° C.), polyacrylonitrile ($T_G$=100° to 110° C., preferably 106° C.), natural and synthetic resins, in particular unsaturated hydrocarbon resins ($T_G$=70° to 200° C.), special types of rubber, in particular cyclorubber ($T_G$=70° to 120° C.), and dispersions of uncrosslinked, slightly crosslinked and crosslinked amorphous polymers ($T_G$ 70° to 200° C. depending on the polymerization partner and the degree of polymerization). If the amorphous polymer is crosslinked, the crosslink density is preferably low enough to permit easy use of the amorphous polymer in the process of this invention; accordingly, slightly crosslinked amorphous polymers are preferred over highly crosslinked amorphous polymers so that they will be easy to process, e.g. in the extruder. The amorphous polymers are known per se and described in the state of the art. Cycloolefin polymers which are likewise known and have been described in EP-A-0,407,870, EP-A-0,503,422 and DE-A-4,036,264, which are incorporated herein by reference, are particularly suitable.

In addition to the amorphous polymers, the voided layer can, in a further embodiment, additionally contain pigments. Within the scope of the present invention, pigments comprise those particles which essentially do not cause formation of voids during stretching. The coloring action of the pigments is caused by the particles themselves. The term "pigment" is in general tied to a particle size of from 0.01 to at most 1 μm and comprises both so-called "white pigments", which confer a white color upon the films, and "color pigment" which confer a coloration or a black color upon the film. In general, the mean particle diameter of the pigments is in the range from 0.01 to 1 μm, preferably 0.01 to 0.7 μm, in particular 0.01 to 0.4 μm. The voided layer of this embodiment comprises pigments in general in a quantity from 1 to 25% by weight, in particular 2 to 20% by weight, preferably 5 to 15% by weight, each relative to the voided layer.

Conventional pigments are materials such as, for example, alumina, aluminum sulfate, barium sulfate, calcium carbonate, magnesium carbonate, silicates such as aluminum silicate (kaolin clay) and magnesium silicate (talc), silica and titanium dioxide, amongst which white pigments such as calcium carbonate, silica, titanium dioxide and barium sulfate are preferentially used.

The titanium dioxide particles are composed to the extent of at least 95% by weight of rutile and are preferably used with a coating of inorganic oxides, such as is normally used as a coating for $TiO_2$ white pigment in papers or paints, in order to improve the light fastness. Particularly suitable inorganic oxides include the oxides of aluminum, silicon, zinc or magnesium, or mixtures of two or more of these compounds. They are precipitated from water-soluble compounds, for example an alkali metal aluminate, in particular sodium aluminate, aluminum hydroxide, aluminum sulfate, aluminum nitrate, sodium silicate or silica, in the aqueous suspension. $TiO_2$ particles having a coating are described, for example, in EP-A-0,078,633 and EP-A-0,044,515.

If desired, the coating also contains organic compounds having polar and non-polar groups. Preferred organic compounds are alkanols and fatty acids having 8 to 30 carbon atoms in the alkyl group, in particular fatty acids and primary n-alkanols having 12 to 24 carbon atoms, and also polydiorganosiloxanes and/or polyorganohydrogensiloxanes such as polydimethylsiloxane and polymethylhydrogensiloxane.

The coating on the $TiO_2$ particles is usually composed of 1 to 12 g, in particular 2 to 6 g, of inorganic oxides and, if desired, 0.5 to 3 g, in particular 0.7 to 1.5 g, of organic compounds are additionally present, in each case relative to 100 g of $TiO_2$ particles. It has proved to be particularly advantageous if the $TiO_2$ particles are coated with $Al_2O_3$ or with $Al_2O_3$ and polydimethyl-siloxane.

The density of the films according to the invention can vary within wide limits and depends inter alia on the nature and quantity of the amorphous polymers and of the pigments which may have been added. The density is in general below the calculated density of the individual components of the film, i.e. the density of the film is reduced. In general, the films have a density of at most 1.5 $g/cm^3$, and preferably the density is in the range from 0.4 to 1.3 $g/cm^3$, in particular 0.5 to 1.0 $g/cm^3$.

The multilayered embodiment, according to the invention, of the film comprises at least one further voided or non-voided layer which can be the base layer (which is typically the innermost layer), an interlayer or a sealable or non-sealable top (outermost) layer of the multilayer film. In principal, the voided layer and the other layer or layers can have the same structure or a different structure.

The other layer comprises in general 75 to 100% by weight, in particular 90 to 99.5% by weight, of α-olefinic polymers having 2 to 10 carbon atoms, in each case relative to the weight of the other layer, and, if appropriate, additives in effective quantities in each case.

Examples of such α-olefinic polymers are
a propylene homopolymer or
a two-unit copolymer of
  ethylene and propylene or
  ethylene and 1-butylene or
  propylene and 1-butylene or
a three-unit copolymer (terpolymer) of
  ethylene and propylene and 1-butylene or
a mixture of two or more of the said homo-, co- and terpolymers or
a blend of two or more of the said homo-, two-unit and three-unit polymers, if appropriate mixed with one or more of the said homo-, two-unit, and three-unit polymers,
a propylene homopolymer or
  random ethylene/propylene copolymers with
    an ethylene content from 1 to 10% by weight, preferably 2.5 to 8% by weight, or
  random propylene/1-butylene copolymers with
    a butylene content from 2 to 25% by weight, preferably 4 to 20% by weight, each relative to the total weight of the copolymer, or random ethylene/propylene/1-butylene three-unit copolymers (terpolymers) with
    an ethylene content from 1 to 10% by weight, preferably 2 to 6% by weight, and
    a 1-butylene content from 2 to 20% by weight, preferably 4 to 20% by weight, each relative to the total weight of the terpolymer, or
  a blend of an ethylene/propylene/1-butylene terpolymer and
  a propylene/1-butylene copolymer with an ethylene content from 0.1 to 7% by weight and a propylene content from 50 to 90% by weight and a 1-butylene content from 10 to 40% by weight, each relative to the total weight of the polymer blend,
being particularly preferred.

The propylene homopolymer used in the other layer or layers contains 97 to 100% by weight of propylene and has in general a melting point of 140° C. or higher, preferably 150° to 170° C., isotactic homopolypropylene having an n-heptane-soluble content of 6% by weight and less, relative to the isotactic homopolypropylene, being preferred. The homopolymer has in general a melt index of 1.5 g/10 minutes to 20 g/10 minutes, preferably 2.0 g/10 minutes to 15 g/10 minutes. The indicated weight percentages relate to the polymer. Other layers of propylene homopolymer form preferably one or more intermediate layers or the top layers of a non-sealable embodiments of the film.

The two-unit copolymers and terpolymers used in the other layer or layers and described above have in general a melt index from 1.5 to 30 g/10 minutes, preferably from 3 to 15 g/10 minutes. The melting point is in general in the range from 120° to 140° C. The blend of co- and terpolymers, described above, has in general a melt index from 5 to 9 g/10 minutes and a melting point from 120° to 150° C. All the melt indices given above are measured at 230° C. and at a force of 21.6N (DIN 53 735). Other layers of two unit- and/or three-unit polymers form preferably the top layers of sealable embodiments of the film.

In principle, the other layer can additionally contain the pigments, described above for the voided layer, in corresponding quantities relative to the weight of this layer. Embodiments with a voided other layer contain, analogously to the voided layer described above, amorphous polymers as void-initiating filler.

In a further advantageous embodiment, the propylene polymers used in the voided layer and/or other layer and/or base layer and/or interlayer and/or top layer can be partially degraded by the addition of organic peroxides. A measure of the degree of degradation of the polymer is the so-called degradation factor A, which indicates the relative change in the melt index of the polypropylene according to DIN 53 735, relative to the starting polymer.

$$A = \frac{MFI_2}{MFI_1}$$

$MFI_1$=Melt index of the propylene polymer for the addition of the organic peroxide
$MFI_2$=Melt index of the propylene polymer degraded by the peroxide mechanism According to the invention, the degradation factor A of the propylene polymer used is in the range from 3 to 15, preferably 6 to 10.

Particularly preferred organic peroxides are dialkyl peroxides, an alkyl radical having to be understood as one of the usual saturated straight-chain or branched lower alkyl radicals having up to six carbon atoms. In particular, 2,5-dimethyl-2,5-di(t-butylperoxy)-hexane or di-t-butyl peroxide are preferred.

The total thickness of the film can vary within wide limits and depends on the intended use. The preferred embodiments of the film according to the invention have overall thicknesses from 5 to 200 μm, 10 to 100 μm and especially 20 to 80 μm being preferred. The thickness of the interlayer or interlayers, which may be present, is in general 2 to 12 μm, independently of one another in each case, interlayer thicknesses from 3 to 8 μm, in particular 3 to 6 μm, being preferred. The indicated values relate in each case to one interlayer. This thickness of the top (outermost) layer or layers is selected independently of the other layers and is preferably in the range from 0.1 to 10 μm, in particular 0.3 to 5 μm, preferably 0.5 to 2 μm, and top layers applied to both sides can be identical or different with respect to thickness and composition. The thickness of the base layer results correspondingly from the difference of the overall thickness of the film and the thickness of the applied top layer(s) and interlayer(s) and can therefore vary within wide limits analogously to the overall thickness.

In order to improve certain properties of the polyolefin film according to the invention even further, both the single-layer film and the voided layer, the other layer, the base layer(s), the interlayer(s) and/or the top layer(s) of the multilayered film can, in each case in an effective quantity, contain additives, if desired low-molecular hydrocarbon resins compatible with the polymer and/or preferably antistatic agents and/or anti-blocking agents and/or lubricants and/or stabilizers and/or neutralizing agents as well as anti-blocking agents. All the quantity data in the explanation below in percent by weight (% by weight) relate in each case to the layer or layers, to which the additive can have been added.

A low-molecular resin is preferably added, for example, for improving the water vapor permeability (WDD) and for improving the film stiffness. It does not produce any voids, in contrast to the abovementioned natural and synthetic resins which are amorphous polymers and are incompatible with the polypropylene. These compatible hydrocarbon resins are low-molecular polymers whose molecular weight is in general in the range from 300 to 8,000, preferably 400 to 5,000, preferably 500 to 2,000. The molecular weight of the resins is thus markedly lower than that of the propylene polymers which form the main component of the individual film layers and in general have a molecular weight of more than 100,000. The content of the resin is in a range from 1 to 30% by weight, preferably 2 to 10% by weight. The softening point of the resin is between 60° and 80° C. (measured according to DIN 1995-U4, corresponding to ASTM E-28), preferably above 100° to 160° C. Amongst the numerous low-molecular resins, the hydrocarbon resins are preferred, and in particular in the form of the petroleum resins, styrene resins, cyclopentadiene resins and terpene resins (these resins are described in Ullmanns Encyklop ädie der techn. Chemie [Ullmann's Encyclopedia of Industrial Chemistry], 4th edition, volume 12, pages 525 to 555). Suitable petroleum resins are described in numerous publications such as, for example, EP-A-0,180,087, which is incorporated herein by reference.

Preferred antistatic agents are alkali metal alkane sulfonates, polyether-modified, i.e. ethoxylated and/or propoxylated polydiorganosiloxanes (polydialkyl-siloxanes, polyalkylphenylsiloxanes and the like) and/or the essentially straight-chain and saturated aliphatic tertiary amines with an aliphatic radical having 10 to 20 carbon atoms, which are substituted by ω-hydroxy-($C_1$–$C_4$)-alkyl groups, N,N-bis-(2-hydroxyethyl)-alkylamines having 10 to 20 carbon atoms, preferably 12 to 18 carbon atoms, in the alkyl radical being particularly suitable. The effective quantity of antistatic agent is in the range from 0.05 to 0.3% by weight.

Lubricants include higher aliphatic acid amides, higher aliphatic acid esters, waxes and metal soaps as well as polydi-methylsiloxanes. The effective quantity of lubricant is in the range from 0.1 to 3% by weight. Particularly suitable is the addition of higher aliphatic acid amides in the range from 0.15 to 0.25% by weight in the base layer and/or in the top layers. A particularly suitable aliphatic acid amide is erucic acid amide. The addition of polydimethylsiloxanes in the range from 0.3 to 2.0% by weight is preferred, in particular of poly-dimethylsiloxanes having a viscosity from 10,000 to 1,000,000 mm$^2$/S.

The stabilizers used can be the conventional compounds having a stabilizing action for ethylene polymers, propylene polymers and other α-olefin polymers. The added quantity thereof is between 0.05 and 2% by weight. Phenolic stabilizers, alkali metal/alkaline earth metal stearates and/or alkali metal/alkaline earth metal carbonates are particularly suitable. Phenolic stabilizers are preferred in a quantity from 0.1 to 0.6% by weight, in particular 0.15 to 0.3% by weight, and with a molecular mass of more than 500 g/mol. Pentaerythritol tetrakis-3-(3,5-di-tertiarybutyl-4-hydroxyphenyl)-propionate or 1,3,5-trimethyl-2,4,6-tris(3, 5-di-tertiarybutyl-4-hydroxybenzyl)benzene are particularly advantageous.

The anti-blocking agents are preferably added to the top layers. Suitable anti-blocking agents are inorganic additives such as silica, calcium carbonate, magnesium silicate, aluminum silicate, calcium phosphate and the like and/or incompatible organic polymers such as polyamides, polyesters, polycarbonates and the like, and benzoguanamine/formaldehyde polymers, silica and calcium carbonate are preferred. The effective quantity of anti-blocking agent is in the range from 0.1 to 2% by weight, preferably 0.1 to 0.5% by weight. The mean particle size is between 1 and 6 μm, in particular 2 and 5 μm, particles having a spherical shape, as described in EP-A-0,236,945 and DE-A-3,801,535, being particularly suitable.

Neutralizing agents are preferably calcium stearate and/or calcium carbonate of a mean particle size of at most 0.7 μm, an absolute particle size of less than 10 μm and a specific surface area of at least 40 m$^2$/g. In general, the neutralizing agent is added in a quantity from 0.02 to 0.1% by weight.

The invention also relates to a process for producing the film, as described above. Within the scope of this process, the procedure is such that the polymers or the polymer blend are compressed in an extruder and heated, the melts corresponding to the film or to the individual layers of the film are then extruded or co-extruded through a sheet die, and the film thus obtained is drawn off for solidification on one or more roller(s), followed by stretch-orientation, thermofixing, and, optionally, a corona or flame treatment.

It has proved to be particularly advantageous to hold the draw-off roller or rollers, by means of which the extruded film is also cooled and solidified, at a temperature from 10° to 90° C., preferably 20° to 60° C.

The initial film thus obtained is stretched preferably longitudinally and transversely to the direction of extrusion, which causes biaxial orienting of the molecule chains. The biaxial orienting can be carried out simultaneously or successively, it being particularly advantageous in successive biaxial stretching first to stretch longitudinally (in the machine direction) and then transversely (perpendicularly to the machine direction). The stretching is preferably 4:1 to 7:1 in the longitudinal direction and preferably 6:1 to 11:1 in the transverse direction. The longitudinal stretching will advantageously be carried out by means of two rollers running at different speeds, corresponding to the desired stretching ratio, and the transverse stretching by means of a corresponding tenter frame.

The temperatures at which the longitudinal and transverse stretching are carried out can vary within a wide range. In general, the longitudinal stretching is carried out at 90° to 150° C. preferably 100° to 140° C., and transverse stretching is carried out at 140° to 190° C., preferably 150° to 180° C.

The biaxial stretching of the film is followed by its thermofixing (heat treatment), the film being held for about 0.5 to 10 seconds at a temperature from 110° to 130° C. Subsequently, the film is wound up in the conventional manner on a winding-up device.

If desired, one or both surface(s) of the film can, as mentioned above, be corona- or flame-treated after the biaxial stretching by one of the known methods, an electric direct voltage being applied between a burner (negative pole) and a cooling roller for a flame treatment with a polarized flame (cf. U.S. Pat. No. 4,622,237). The level of the applied voltage is between 500 and 3,000 V, preferably in the range from 1,500 to 2,000 V. The ionized atoms obtain an increased acceleration by the applied voltage and impinge onto the polymer surface with a higher kinetic energy. The chemical bonds inside the polymer molecule are more easily broken, and the formation of the free radicals proceeds faster. The thermal stress on the polymer is in this case far lower than in the case of the standard flame treatment, and films can be obtained, in which the sealing properties of the treated side are even better than those of the untreated side.

For the alternative corona treatment, the film is passed through between two conductor elements serving as electrodes, such a high voltage, in most cases an alternating voltage (about 10,000 V and 10,000 Hz), being applied between the electrodes that spray discharges or corona discharges can take place. The air above the film surface is ionized by the spray discharge or corona discharge and reacts with the molecules of the film surface, so that polar inclusions are produced within the substantially non-polar polymer matrix. The treatment intensities are within the conventional range, 38 to 45 mN/m being preferred.

The amorphous polymers are incorporated into the film either as pure granules or as a granulated concentrate (masterbatch), by premixing the polyolefin granules or powder with the amorphous polymer and then feeding the mixture to the extruder. In the extruder, the components are mixed further and heated to the processing temperature. It has been found that the opacity and the gloss of the film also depend on the extrusion conditions (temperature, shear). Surprisingly, the opacity and the gloss can be varied solely via the conditions in the extruder under otherwise identical conditions with respect to raw material and stretching process. This opens up completely new approaches for adjusting the characteristics of a translucent or opaque film. It is here essential for the process according to the invention that the extrusion temperature is above the glass transition temperature/Vicat softening point of the amorphous polymer. In general, the extrusion temperature is at least 10° C., preferably 15° to 180° C., in particular 20° to 150° C., above the $T_G$ or $T_V$ of the amorphous polymer.

It is assumed that the amorphous polymer liquefies under the extrusion conditions conventional in film manufacture and then, during the extrusion, surprisingly separates into particulate grains of greater or lesser size, depending on amorphous polymer viscosity and olefin polymer viscosity, as explained previously. According to the available evidence, these particles formed in situ during the extrusion can then act during the orienting of the film in a manner similar to the known particulate void-initiating fillers. The aforementioned evidence includes scanning electron micrographs of the oriented film, which show that the film has voids in which particulate grains of the amorphous polymer are present. This means that the amorphous polymer, which is added simply as a solid, is present in the film after the extrusion and orienting in the form of finely dispersed particles which are located inside the voids.

The invention will now be explained and illustrated in even more detail by reference to the following non-limiting examples.

EXAMPLE 1

By co-extrusion and subsequent stepwise orienting in the longitudinal and transverse directions, an opaque three-layer film of symmetrical structure was produced with an overall thickness of 40 μm. The top layers each had a thickness of 0.6 μm.

| A base layer (= voided layer): | |
|---|---|
| 94.85% by weight | highly isotactic polypropylene made by Solvay under the brand name ® Eltex PHP 405 |
| 5.0% by weight | aromatic polycarbonate having reduced heat distortion and a Vicat softening point of $T_v = 160°$ C. (® Apec HT, natural color, made by Bayer) |
| 0.15% by weight | N,N-bis-ethoxyalkylamine |
| B top layers: | |
| 98.77% by weight | random ethylene/propylene copolymer having a $C_2$ content of 4.5% by weight |
| 0.33% by weight | $SiO_2$ of a mean particle size of 2 μm as anti-blocking agent |
| 0.90% by weight | polydimethylsiloxane having a viscosity of 30,000 mm$^2$/s |

The production conditions in the individual process steps were:

| Extrusion: | Temperatures | |
|---|---|---|
| | A layer: | 280° C. |
| | B layers: | 280° C. |
| | Temperature of the draw-off roller: | 30° C. |
| Longitudinal stretching: | Temperature: | 130° C. |
| | Longitudinal stretching ratio: | 6.5 |
| Transverse stretching: | Temperature: | 170° C. |
| | Transverse stretching ratio: | 8.5 |
| Fixing: | Temperature: | 140° C. |
| | Convergence: | 15% |

The film produced in this way is translucent.

EXAMPLE 2

As compared with Example 1, the amorphous polymer in the base layer was changed. The polycarbonate ®Makrolon CD 2005 having a $T_V$ of 141° C. was now used. The film produced had an opaque appearance.

EXAMPLE 3

As compared with Example 2, the amorphous polymer in the base layer was changed. An atactic polystyrene having a $T_G$ of 100° C. was now used. The longitudinal stretching temperature was lowered by 20° C. The film produced had an opaque appearance.

EXAMPLE 4

As compared with Example 3, the amorphous polymer in the base layer was changed. The cyclic rubber ®Alpex 450 (Hoechst AG, $T_G$=80° C.) was now used. The longitudinal stretching temperature was as in Example 3. The film produced had a translucent opaque appearance.

EXAMPLE 5

As compared with Example 3, the amorphous polymer in the base layer was changed. A cycloolefin copolymer having a $T_G$ of 174° C. and a mean molecular weight of 34,000 was now used. The longitudinal stretching temperature was as in Example 1. The film produced had an opaque-white appearance and a paper-like character.

EXAMPLE 6

As compared with Example 5, only the extrusion temperature was lower by 30° C. The film produced in this way had an opaque-white appearance.

The following measurement methods were used for characterizing the raw materials and the films:

Melt index

The melt index was measured analogously to DIN 53 735 at 21.6N load and 230° C.

Melting point

DSC measurement, maximum of the melting curve, heating-up rate 20° C./minute.

Density

The density is determined according to DIN 53479, method A.

Gloss

The gloss was determined according to DIN 67 530. The reflector value was measured as the optical parameter for the surface of a film. Analogously to the standards ASTM-D 523-78 and ISO 2813, the angle of incidence was set to 60° or 85°. A light beam strikes the planar test surface under the set angle of incidence and is reflected and/or scattered by the surface. The light beams striking the photo-electronic receiver are indicated as a proportional electrical value. The measured value is dimensionless and must be reported together with the angle of incidence.

Opacity and whiteness

The opacity and the whiteness are determined by means of the electric remission photometer "ELREPHO" made by Zeiss, Oberkochem (Germany), standard light type C, 2° normal observer. The opacity is determined according to DIN 53 146. The whiteness is defined as WG=RY+3RZ–3RX. WG=whiteness; RY, RZ, RX=corresponding reflection factors when using the Y, Z and X color measurement filter. A pressed piece of barium sulfate (DIN 5033, part 9) is used as a white standard. A detailed description is given, for example, in Hansl Loos "Farbmessung" [Color Measurement], Verlag Beruf und Schule, Itzehoe (1989).

Light transmission

The light transmission is measured analogously to ASTM-D 1003-77.

Mean molecular weight and dispersity of the molecular masses

The mean molecular masses ($M_w$, $M_n$) and the mean dispersity ($M_w/M_n$) of the molecular masses were determined analogously to DIN 55 672, Part 1, by means of gel permeation chromatography. In place of THF, ortho-dichlorobenzene was used as eluant. Since the olefinic polymers to be examined are insoluble at room temperature, the entire measurement is carried out at elevated temperature (~135° C.).

Crystallinity

The crystallinity was determined by means of X-ray methods. In this case, the corrected diffracted X-ray intensities were set to be proportional to the fractions of the amorphous and crystalline phases.

Glass Transition temperature

The samples were examined by means of DSC (Differential Scanning Calorimetry). The heating-up rate was 20K/minute. In order to eliminate the thermal history in the specimen, the specimen was first heated in DSC apparatus to a temperature above the glass transition temperature $T_G$, rapidly cooled and then heated again (second heating-up). The temperature for the glass transition was taken as half the step height from the thermogram for the second heating-up.

Vicat softening point

The Vicat softening point VST/B/120 was measured according to ISO 306, DIN 53 460.

What is claimed is:

1. An oriented polyolefin film comprising at least one voided layer, wherein said voided layer consists essentially of an olefin polymer and an amorphous void-initiating polymer with said amorphous void-initiating polymer being present as a separate particle inside said voids after orientation, wherein said amorphous void-initiating polymer has a degree of crystallinity of less than 5% and wherein said amorphous void-initiating polymer is a polycarbonate.

2. An oriented polyolefin film as claimed in claim 1, wherein said olefin polymer and said amorphous, void-initiating polymer are initially blended together under polymer liquefying conditions, such that said amorphous, void-initiating polymer is initially not present as a separate particulate phase.

3. An oriented polyolefin film as claimed in claim 1, wherein said film comprises said voided layer and at least one further layer.

4. An oriented polyolefin film as claimed in claim 1, wherein the voided layer contains 70 to 99% by weight of said olefin polymer and 1 to 30% by weight of said amorphous, void-initiating polymer, each relative to the weight of the voided layer.

5. An oriented polyolefin film as claimed in claim 1, wherein the film has a light transmission of less than 95%, measured according to ASTM-D 1003-77.

6. An oriented polyolefin film as claimed in claim 1, wherein the amorphous, void-initiating polymer has a glass transition temperature $T_G$ in the range from 70°0 to 300° C. or a Vicat softening point $T_V$ from 70° to 200° C.

7. An oriented polyolefin film as claimed in claim 1, wherein the amorphous, void-initiating polymer has a mean molecular weight $M_w$ from 500 to 500,000.

8. An oriented olefin polymer film as claimed in claim 1, wherein the amorphous, void-initiating polymer has a refractive index from 1.3 to 1.7 and this refractive index is at most 0.1 unit greater or smaller than the refractive index of the olefin polymer.

9. An oriented polyolefin film as claimed in claim 1, wherein the amorphous, void-initiating polymer particles present in the voids have a particle size in the range from 0.2 to 10 μm.

10. An oriented polyolefin film as claimed in claim 1, wherein the voided layer additionally comprises a non-void-initiating pigment.

11. An oriented polyolefin film as claimed in claim 1, wherein the density of the polyolefin film is at most 1.5 g/cm$^3$.

12. An oriented polyolefin film as claimed in claim 1, wherein the voided layer forms the base layer, an interlayer or an outermost layer of the film.

13. An oriented polyolefin film as claimed in claim 12, wherein said film comprises a plurality of voided layers or includes at least one additional layer in addition to said voided layer, said additional layer containing 75 to 100% by weight of an α-olefinic polymer.

14. An oriented polyolefin film as claimed in claim 13, wherein said additional layer forms the base layer, an interlayer or an outermost layer of the film and optionally contains a non-void-initiating pigment.

15. An oriented polyolefin film as claimed in claim 12, wherein an olefin polymer present in the base layer, an interlayer, or an outermost layer has been degraded by a peroxide mechanism.

16. An oriented polyolefin film as claimed in claim 1, wherein the film is essentially a single-layer structure consisting essentially of the voided layer.

17. An oriented polyolefin film comprising at least one oriented, voided layer, wherein said voided layer comprises an olefin polymer and, as an amorphous void-initiating polymer, an amorphous polycarbonate having a degree of crystallinity of less than 5%, said amorphous polycarbonate being present in said oriented, voided layer, after orientation, as a separate particle inside said voids.

18. An oriented polyolefin film as claimed in claim 1, wherein said voided layer is opaque.

* * * * *